United States Patent [19]
Glitho et al.

[11] Patent Number: 5,638,357
[45] Date of Patent: Jun. 10, 1997

[54] DISTRIBUTED METHOD FOR PERIODICAL ROUTING VERIFICATION TEST SCHEDULING

[75] Inventors: Roch Glitho, Montreal, Canada; Richard Holm, Haninge, Sweden

[73] Assignee: Telefonaktiebolaget LM Ericsson (publ), Stockholm, Sweden

[21] Appl. No.: 519,658

[22] Filed: Aug. 25, 1995

[51] Int. Cl.⁶ .............................. H04Q 1/20; H04L 12/26
[52] U.S. Cl. ........................... 370/250; 370/252; 370/400
[58] Field of Search ............................... 370/13, 14, 15, 370/16, 17, 54, 60, 60.1, 94.1, 94.3, 110.1, 68.1; 379/5, 10, 14, 16, 230; 395/183.01, 182.01, 182.02

[56] References Cited

U.S. PATENT DOCUMENTS

| | | | |
|---|---|---|---|
| 4,486,877 | 12/1984 | Turner | 370/15 |
| 4,670,871 | 6/1987 | Vaidya | 370/60 |
| 4,696,000 | 9/1987 | Payne, III | 370/60 |
| 4,745,593 | 5/1988 | Stewart | 370/15 |
| 5,218,601 | 6/1993 | Chujo et al. | 370/13 |
| 5,233,607 | 8/1993 | Barwig et al. | 370/94.1 |
| 5,241,533 | 8/1993 | Kimoto et al. | 370/13.1 |
| 5,371,732 | 12/1994 | Brocken et al. | 370/16 |
| 5,412,654 | 5/1995 | Perkins | 370/94.1 |
| 5,426,688 | 6/1995 | Anand | 370/13 |

OTHER PUBLICATIONS

CCITT Draft Recommendation Q. 751 "Signaling System No. 7—Managed Objects", Geneva, 1993, pp. 1–10.
CCITT Recommendation Q. 753 "Signaling System 7 Management Functions MRVT, SRVT, CVT and Definition of OMASE—USER", Geneva, 1999, pp. 1–12.
Bellcore "CCS Node Generic Requirements to Support Routing Verification Tests", Nov. 1993.

*Primary Examiner*—Douglas W. Olms
*Assistant Examiner*—Chau T. Nguyen
*Attorney, Agent, or Firm*—Smith & Catlett, P.C.

[57] ABSTRACT

There is disclosed a method for scheduling verification tests to audit routing information in a packet switching network comprising a plurality of packet switching nodes and a plurality of bi-directional links each interconnecting a distinct pair of said nodes. The method begins with the steps of selecting a test time duration period for scheduling the verification tests of the routing information in the network and selecting a number of nodes to be tested. The method determines for each node to be tested in the network: (i) a number of sub-tests to be run via the bi-directional links to all destination nodes associated with the test node, (ii) generates a time gap interval based on the quotient of the scheduled test time duration period by the number of sub-tests to be conducted, (iii) generates a random number greater than or equal to 0 and less than or equal to the time gap interval for each sub-test to be run, and (iv) schedules the verification sub-tests in succession during the time test duration period by staggering starting of the first sub-test from the commencement of the time test duration period, and all succeeding sub-tests from the completion of the previous sub-test, by a respective time interval which is a function of the time gap interval and the random number for that sub-test. The method of the present invention has the advantage in that it randomly disperses the running of the verification sub-test in the network over a test time frame. As a result, traffic loading induced on the network by the verification tests is dispersed and risk of overloading the network is reduced.

8 Claims, 4 Drawing Sheets

Fig. 2

| Node  | Primary Link Set | Alternative Link Sets |
|-------|------------------|-----------------------|
| Start | 27               | 28, 26                |
| STP 1 | 32               | 34                    |
| STP 2 | 40               | 30                    |
| STP 3 | 42               | 36                    |
| STP 4 | 38               | No Entry              |

DISTRIBUTED METHOD FOR PERIODICAL ROUTING VERIFICATION TEST SCHEDULING

FIELD OF THE INVENTION

The present invention relates to a method for auditing routing table information in a packet switching network. In particular, it relates to a method of scheduling tests to check the correctness of routing table information associated with respective switching nodes or signal transfer points of Signaling System No. 7 (SS7) networks.

BACKGROUND OF THE INVENTION

Routing of messages from a source node to a destination node in networks, such as for example packet switched networks (PSN's), is performed automatically by the use of routing tables. A routing table is located at each node of the network and contains information as to the link set between nodes that the message is to be transmitted. This information usually includes a preferred or normal route and one or more secondary or failure routes.

Signaling System No. 7 (SS7) interconnects stored program control exchanges, network data bases and intelligent peripherals of telecommunications management networks. SS7 is used to exchange messages and information respectively related to call management and to distributed applications and network management. The protocols of SS7 have been standardized by the "Comite Consultatif International pour le Telephone et le Telegraphe" (CCITT) which is known today as the International Telecommunications Union (ITU)—Telecommunications Standardization Sector (TSS).

To operate properly, the correct routing table information is loaded and stored in each table at system start-up or generation. This information is constant and the routing table is described as "static". The routing tables may also be described as "partial path" because the information stored in each table relates only to the next node on the way to the destination. The integrity of the routing information stored in the tables is fundamental to the normal functioning of the network.

Network communication problems arise when the routing information in tables is incorrect or becomes corrupted. One example of a problem is when the table fails to contain an entry for a destination node causing the message to stop at that node and to fail to make it to its destination. Another problem example occurs when two or more node tables contain destination information directed to each other resulting in the message traveling in an endless loop. A third message transmission problem occurs when the message tree between the source node and the destination node results in an excessive length route where the message crosses more STP's than the maximum allowed STP's in the network. Still yet another problem occurs when the signal path through the network is unidirectional. That is to say the message can travel in one direction through the tree from the source node to the destination node but it cannot travel in the reverse direction from the destination node to the source node.

In SS7 networks there are currently two methods used to check the correctness of SS7 routing tables.

The first method involves checking "off-line" the correctness of the routing data before the introduction of this data to the tables. Various simulation methods are used for to check the information. The problem with this method resides in errors introduced during the manual data entry of the information in the table for each node by the operational staff. Further, data corruption can occur after entry. This "off-line" method of testing table data information does not safe-guard against errors occurring during loading of the data in the tables or against errors due to data corruption.

The second method used to check the correctness of SS7 routing tables is a real time check of the table routing data in the network. It consists of auditing "on-line" during network operation the routing data after it has been introduced in the tables. There are two known "on-line" tests in use today to check the correctness of SS7 routing data. These tests are known as the Message Transfer Part (MTP) Routing Verification Test (MRVT) and the Signaling Connection Control Part (SCCP) Routing Verification Test (SRVT). The MRVT and the SRVT check respectively the content of the Message Transfer Part (MTP) routing tables and the content of the SCCP routing tables. These tests are initiated at one or more predetermined source nodes to test the routes messages will follow to respective predetermined destination nodes. Usually each test results in the message following all possible routes to its test destination. This is done by sending multiple test messages and tracking the identities of all nodes crossed by the message. Information on the success of this testing is transmitted back to the destination node. An example of an "on-line" testing procedure is disclosed in U.S. Pat. No. 4,745,593 issued May 17, 1988 to Gilbert M. Stewart.

One problem associated with this routing verification testing is the extra network loading associated with the testing. The networks are already operating under time restraints to deliver messages between source nodes and destination nodes. The introduction of the "on line" testing to be thorough should be conducted periodically in the SS7 network as suggested by the ITU-TSS standards. During each period, from every node, a test is run against all the destinations which can be reached from the node. For example, if a network has 20 nodes, there could be hundreds of possible test routes to follow in one test. This one test could significantly load the network. SS7 networks are signaling networks with very stringent delay objectives that the networks can hardly meet when they are overloaded. Consequently, operators are reluctant to perform tests of routing tables in networks.

In view of the foregoing, it can be appreciated that there is a problem with routing table information and the verification of that information particularly after the table information has been loaded into the network. There does not appear to be a solution available to the operator to check periodically "live" information without the risk of unduly overloading the network with test messages and placing legitimate messages at risk of being lost. This risk is more serious when many tests are started at the same time or very close in time such that several tests are running at the same time.

SUMMARY OF THE INVENTION

In accordance with an aspect of the present invention there is provided a method for scheduling verification tests to audit routing information in a packet switching network. The method determines for each node to be tested in the network:

(i) a number of sub-tests to be run to all destination nodes associated with the test node and, (ii) randomly schedules the sub-tests during a time test duration period by staggering starting of each sub-test by a randomly chosen time interval.

Preferably the method utilizes a random number generator in each node to minimize the probability that tests are initiated simultaneously in many nodes.

In accordance with one aspect of the present invention the method comprises scheduling verification tests to audit routing information in a packet switching network comprising a plurality of packet switching nodes and a plurality of bi-directional links each interconnecting a distinct pair of the nodes. The method comprises the steps of:

a) selecting a test time duration period for scheduling the verification tests of the routing information in the network, b) selecting a number of nodes to be tested, and, c) determining for each node to be tested in the network:

(i) a number of sub-tests to be run via the bi-directional links to all destination nodes associated with the test node, (ii) generating a time gap interval based on the quotient of the scheduled test time duration period by the number of sub-tests to be conducted, (iii) generating a random number greater than or equal to 0 and less than or equal to the time gap interval for each sub-test to be run, and (iv) scheduling the verification sub-tests in succession during the time test duration period by staggering starting of the first sub-test from the commencement of the time test duration period, and all succeeding sub-tests from the completion of the previous sub-test, by a respective time interval which is a function of the time gap interval and the random number for that sub-test.

The method for scheduling routing verification tests of the present invention has the advantage in that it randomly disperses the running of the verification sub-test in the network over a test time frame. As a result, traffic loading induced on the network by the verification tests is dispersed and risk of overloading the network is reduced.

The method may select the test time duration period for scheduling the verification tests from off peak demand hours. Preferably, the off peak demand hours are selected between 1:00 a.m. and 4:00 a.m. Also, the verification test preferably is selected from one of a message transfer part routing verification test and a signaling connection control part routing verification test in an SS7 signaling system.

In accordance with another aspect of the present invention there is provided a system for scheduling verification tests to audit routing information in a package switching network comprising a plurality of package switching nodes. The system comprises means for selecting a test time duration period for scheduling the verification tests of the routing information in the network and means for selecting a number of nodes to be tested. The system includes test scheduling means for determining for each node to be tested in the network a number of sub-tests to be run via the bi-directional links to all destination nodes associated with the test node. The test scheduling means comprises means for randomly scheduling the sub-tests during the time test duration period by staggering starting of each sub-test by a randomly chosen time interval.

BRIEF DESCRIPTION OF THE DRAWINGS

For a better understanding of the nature and objects of the present invention reference may be had to the accompanying diagrammatic drawings in which:

FIG. 2 illustrates a correct routing table for the switching network of FIG. 1;

DETAILED DESCRIPTION

Figure 1:
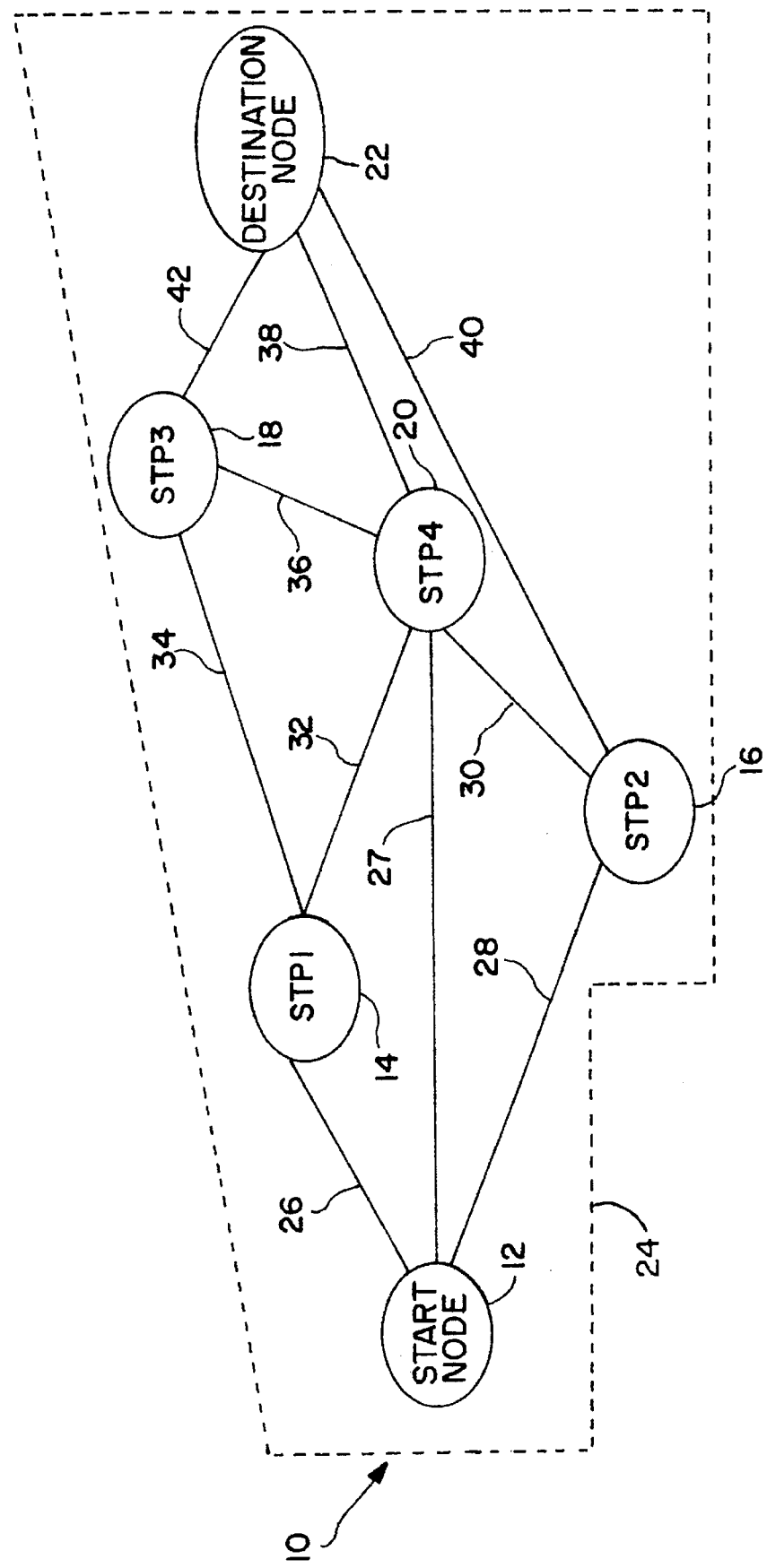
FIG. 1 illustrates the a switching network in accordance with the present invention.
Figure 3:
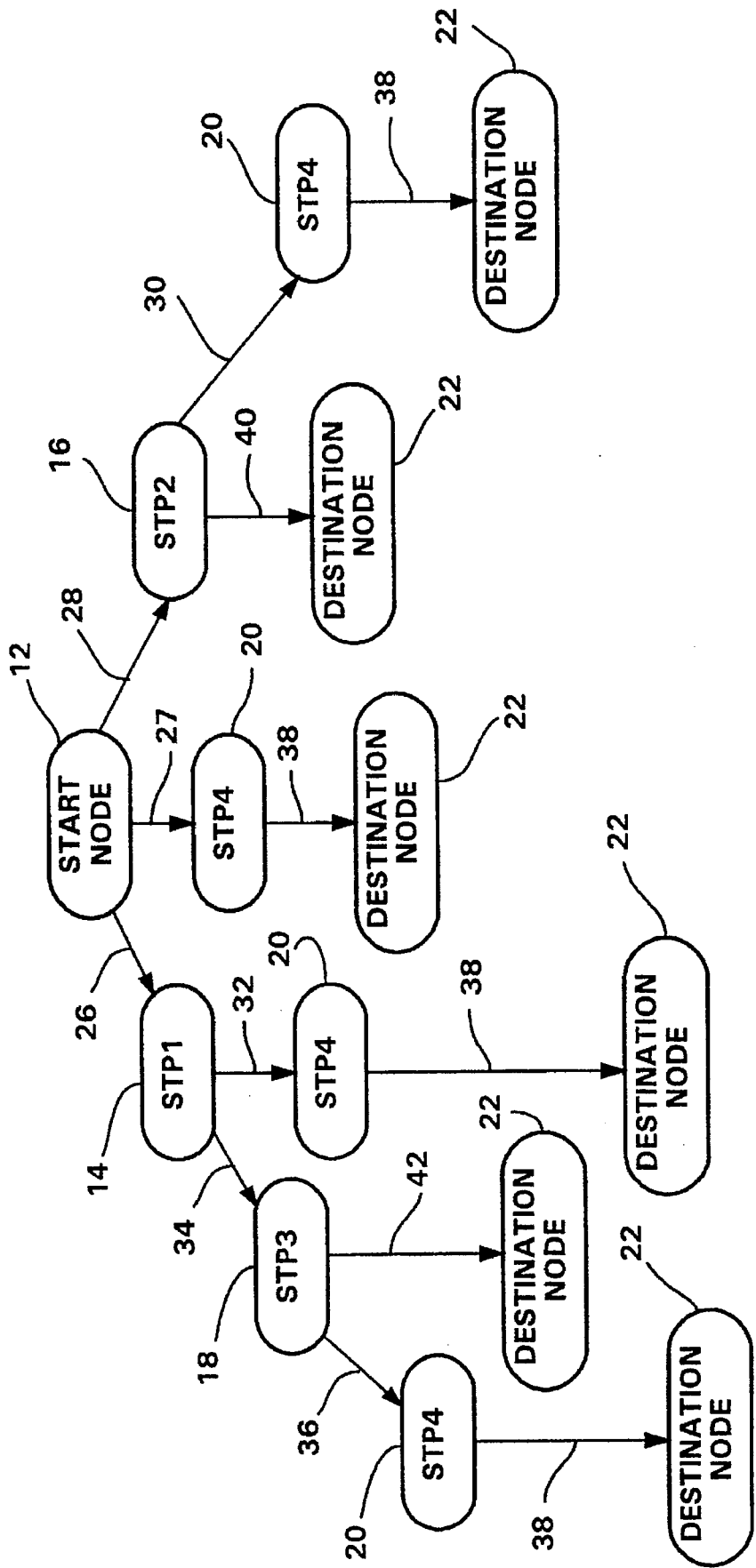
FIG. 3 illustrates a message tree for the switching network of FIG. 1 and routing table of FIG. 2.

Reference will be made to FIGS. 1 to 3 to describe a typical network and routing of messages within that network.

Referring to FIG. 1 there is shown a switching network within the broken lines 10. Switching network 10 includes 6 switching nodes or signaling transfer points labeled 12, 14, 16, 18, 20, and 22. The illustrated network has been drawn to illustrate a start or initiation node 12, a destination node 22 and intermediate nodes 14, 16, 18, and 20. It should be understood that for the purpose of this description, the start node 12 and the destination node 22 may be intermediate nodes in other signal transfers, but have been so designated for the purpose of defining one verification test to be conducted by the method of the present invention.

The switching network of the preferred embodiment of the present invention shown within broken line 24 is a CCITT SS7 network. Each of the nodes 12 through 22 respectively shown within the network includes a routing table associated therewith for routing a signal along one or more link sets to a subsequent node in the routing of the signal within the network. The routing table information is both static and partial path. The link sets between the nodes are shown by link set connection 26 between nodes 12 and 14, link set 27 between nodes 12 and 20, link set 28 between nodes 12 and 16, link set 30 between nodes 16 and 20, link set 32 between nodes 14 and 20, link set 34 between nodes 14 and 18, link set 36 between nodes 18 and 20, link set 38 between nodes 20 and 22, link set 40 between nodes 16 and 22, and link set 42 between nodes 18 and 22.

Referring to FIG. 2 there is shown an example of the routing table information for each of the nodes 12 through 20. In the middle column of Table 1, the primary link set is defined as the preferred or primary route along which a message or a signals transferred from the node defined in the left most column. The right most column indicates alternative link sets along which a signal will pass or travel in the event the primary path is either disabled or busy. Accordingly, a message at node 12 will be sent primarily along link set 27 to node 20. In the event a message cannot be sent along link set 27, node 12 will switch the message to send it either along link set 26 to node 14 or link set 28 to node 16. Likewise, node 14 will primarily send its message over link 32 to node 20 however, in the event that node link 32 is busy or not able to function, node 14 will route its message along link 34 to node 18. Node 16 has primary route along link set 40 to rode 22. In the event that the signal cannot travel along link set 40, node 60 will direct its message along link set 30 to node 20. Node 18 has a primary message routing along link set 42 to node 22 and a secondary or alternate path along link set 36 to node 20. Node 20 has a primary route along link set 38 to node 27. In this example, node 20 has no alternative link set route.

With this routing information table in FIG. 2, a message initiated at node 12 having a destination of node 22 may follow a route to the destination node through several different switching nodes depending on the channels that are open for communicating the messages between the nodes.

Referring to FIG. 3 there is shown a message tree for the SS7 network portion of FIG. 1 and the routing table of FIG. 2. From the message tree of FIG. 3, it can be seen that there are potentially 6 working paths through different nodes that the message can follow to get to the destination node 22 from the initiation or the starting node 12. The primary route for a message to travel from start node 12 to destination node 22 is (from FIG. 2) along link set 27 to node 20. Once the message is at switching node 20, switching node 20 would direct the message along link set 38 to destination node 22. In the event these channels or link sets are not open, then an alternative route would be determined to the destination node 22 from the start node 12 through which a communication channel would be set up for transferring the message.

It should be understood from FIG. 3 that to run one verification test on this network to check the integrity of the routing tables of the nodes from the source node 12 to the destination node 22 will result in the generation of many test messages. For each branch in the tree, a transmit message and an acknowledgment message will be generated. There are 13 branches between the nodes of the test FIG. 3 which results in a total of 26 transmit and acknowledge messages being generated. A further 6 receive messages are generated at destination node 22 since there are 6 paths to reach this node. To expand the verification testing to all nodes in a network that can have anywhere from 20 to upwards and beyond 100 nodes, will result in a very high load demand being placed on the network.

Figure 4:
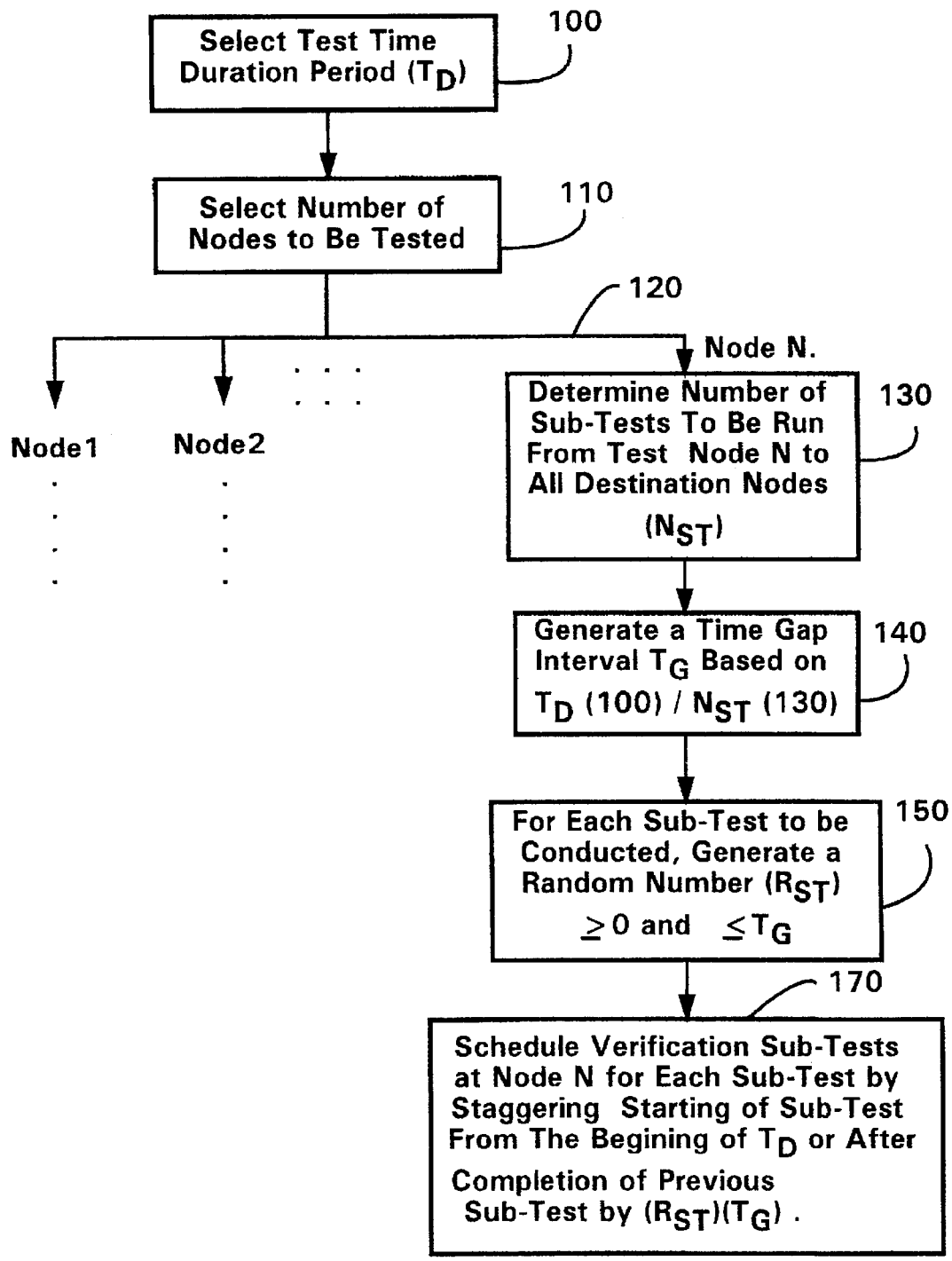
FIG. 4 is a flow chart of the steps performed by an operation system of the present invention.

Referring now to FIG. 4 there are shown the steps involved in the method of the present invention in scheduling verification testing of nodes in the network by commencing verification sub-tests at each node at randomly chosen time intervals. The first two steps in the method are shown in FIG. 4 at 100 and 110. The first step 100 is for the selection of a test time duration period during which the tests will be performed in the network. The test time duration period is preferably selected from low demand or off peak demand hours. This would be early in the morning between 1 a.m. and 4 a.m., local time. It should be understood however, that the length of this time interval may be varied on a daily basis depending on the demand on the network. Accordingly, the preferred test time duration would be 3 hours or 180 minutes. ($T_D$=180).

The second step in the method 110 involves the selection of a number of nodes to be tested. While preferably all nodes in the network should be tested during the selected test time duration period, if the period is not sufficiently long enough to run all the test without tests overlapping, then the number of nodes to be tested may be reduced.

Then for each node to be tested 120, there is at 130 a determination of sub-tests to be made from each selected node to all other nodes in the network. The number of sub-tests to be run for a node is identified as $N_{ST}$. Referring back to FIG. 1, node 12 would require three sub-tests to nodes 14, 20 and 16. Node 20 would require 5 sub-tests to nodes 12, 14, 16, 18, and 22.

At step 140 the time gap interval for node N is determined. The time gap interval $T_G$ is the quotient of $T_D/N_{ST}$. For node 12 of FIG. 1, $T_G$=180/3=60. For node 20, $T_G$=180/5=36.

At step 150 a random number $R_{ST}$ for each sub-test is generated by a random number generator in the node. The random number generated is greater than or equal to 0 and less than or equal to $T_G$.

At step 170, scheduling the verification sub-tests occurs where each sub-test in the node N is scheduled in succession during the time test duration period by staggering starting of the sub-tests. The first sub-test is staggered from the commencement of the time test duration period by a time interval which is a function of the time gap interval and the random number for that sub-test. All succeeding sub-tests are scheduled from the completion of the previous sub-test by a respective time interval which is a function of the time gap interval and the random number for that sub-test. This scheduling of sub-tests occurs in this fashion at each node which reduces the chances of more than one sub-test in the network commencing at any given time.

We claim:

1. A method for scheduling verification tests to audit routing information in a packet switching network comprising a plurality of packet switching nodes, the method comprising the steps of:

a) selecting a test time duration period for scheduling the verification tests of the routing information in the network; and b) determining for each node to be tested in the network:

(i) a number of sub-tests to be run to all destination nodes associated with the test node; and (ii) randomly scheduling the sub-tests during the time test duration period by staggering starting of each sub-test by a randomly chosen time interval.

2. The method claim 1 wherein the step of selecting a test time duration period for scheduling the verification tests is selected from off peak demand hours.

3. The method of claim 2 wherein the off peak demand hours are selected between 1:00 a.m. and 4:00 a.m.

4. The method of claim 1 wherein the verification test is selected from the group consisting of a message transfer part routing verification test and a signaling connection control part routing verification test in an SS7 signaling system.

5. A method for scheduling verification tests to audit routing information in a packet switching network comprising a plurality of packet switching nodes and a plurality of bi-directional links each interconnecting a distinct pair of the nodes, the method comprising the steps of:

a) selecting a test time duration period for scheduling the verification tests of the routing information in the network;

b) selecting a number of nodes to be tested; and c) determining for each node to be tested in the network:

(i) a number of sub-tests to be run via the bi-directional links to all destination nodes associated with the test node;

(ii) generating a time gap interval based on the quotient of the scheduled test time duration period by the number of sub-tests to be conducted;

(iii) generating a random number greater than or equal to 0 and less than or equal to the time gap interval for each sub-test to be run; and (iv) scheduling the verification sub-tests in succession during the time test duration period by staggering starting of the first sub-test from the commencement of the time test duration period, and all succeeding sub-tests from the completion of the previous sub-test, by a respective time interval which is a function of the time gap interval and the random number for that sub-test.

6. The method of claim 5 wherein the step of selecting a test time duration period for scheduling the verification tests is selected from off peak demand hours.

7. The method of claim 6 wherein the off peak demand hours are between 1:00 a.m. and 4:00 a.m.

8. The method of claim 5 wherein the verification test is selected from the group consisting of a message transfer part routing verification test and a signaling connection control part routing verification test in an SS7 signaling system.

* * * * *